United States Patent Office 3,809,639
Patented May 7, 1974

3,809,639
SOLID ELECTROLYTE COMPACT FOR PROBE USED IN QUANTITATIVE DETERMINATION OF GAS DISSOLVED IN MOLTEN METAL
Donald K. Faurschou, Kanata, Ontario, and Donald C. Misener and James C. Pope, Ottawa, Ontario, Canada, and Richard Hadden, Paisley, Scotland, assignors to Canadian Patents and Development Limited, Ottawa, Ontario, Canada
Original application July 15, 1970, Ser. No. 54,937. Divided and this application Apr. 12, 1972, Ser. No. 243,492
Claims priority, application Canada, Dec. 24, 1969, 70,847
Int. Cl. G01n 27/46
U.S. Cl. 204—195 S                                4 Claims

ABSTRACT OF THE DISCLOSURE

Solid electrolyte compacts are provided for use in a probe tip for the quantitative determination of gas dissolved in molten metal, the electrolyte being an elongated compact formed of solid oxide electrolyte which both retains its ionic conduction properties and which does not exhibit substantial electronic conduction properties at the temperature of the molten metal, said solid electrolyte being, for example, lime-stabilized zirconia. The compact also includes a fugitive binder, e.g., polyvinyl alcohol, and optionally contains a small amount of a suitable high temperature binder. The compact is provided with a beaded wire-accepting depression axially therein.

This is a division of application Ser. No. 54,937, filed July 15, 1970.

BACKGROUND OF THE INVENTION

Field of the invention

This invention relates to an apparatus for the direct determination of a gas, e.g. oxygen dissolved in molten metals. It is more particularly directed to a probe for the direct determination of oxygen dissolved in molten steel.

It also relates to components of such a probe.

The prior art

Selective oxidation and subsequent deoxidation form the basis of many commercially important extraction metallurgy processes. Consequently, the determination of the oxygen content of molten metals, for example, iron, iron alloys, steel, nickel, nickel alloys, copper, or copper alloys, has received considerable attention. Methods currently being used for such oxygen determination are based on the doubtful hope that samples taken from the melt, then solidified and subsequently analyzed will be representative of conditions in the melt. The results which are obtained are generally uncertain and they are usually not obtained until long after the melt has been cast and is in some further stage of processing. The advantages of obtaining direct accurate oxygen determination in the processing furnace include the avoidance of sampling variables, since it is conducted in situ, and the determination of soluble (active) oxygen as against total oxygen.

It is now possible to determine the soluble or dissolved oxygen content of molten metals by making use of the principles of galvanic oxygen concentration fuel cells. Probably the most important development for the iron and steel industry has been the use of half-cells which involve the presence of a gas on the reference side of the electrolyte and the gas which is dissolved in the molten metal on the other side of the electrolyte. Examples of such half-cells include: stabilized zirconia tubes, closed at the immersion end, using air as the reference electrode; and a fused silica tube with a stabilized zirconia disc tip as the solid electrolyte, sheathed by a sleeve sheath of graphite, and protected from contact with the slag by means of a metal disc.

Practical disadvantages in the above-described probes include: the high cost of zirconia tubes; the high sensitivity of zirconia tubes to thermal shock; the preheating or slow heating of the electrolyte introduces a time delay, and thus, the zirconia tube might be suitable for research purposes but not for, e.g. steel mills, since it cannot be used in a direct test; the difficulty of fusing the preformed zirconia disc into the quartz tube; and the difficulty in maintaining adequate contact of the electrical lead or leads with the electrolyte.

Copending U.S. application Ser. No. 680,471 filed Nov. 3, 1967, now abandoned, provided disposable oxygen probes for molten metals utilizing masses of lime-stabilized zirconia or other ionic electrolytes sintered in the probe in situ in molten metals.

SUMMARY OF THE INVENTION

Aims of the invention

An object, therefore, of one broad aspect of the present invention is the provision of an apparatus for the direct determination of a dissolved gas, e.g. oxygen, dissolved in a molten metal, which apparatus is relatively easy to produce.

An object of another aspect of the present invention is the provision of a gas half-cell probe for the direct determination of oxygen in iron, iron alloys, steel, nickel, nickel alloys, copper, or copper alloys in which the electrical lead or leads are firmly secured to the solid electrolyte.

An object of another aspect of the present invention is the provision of a gas half-cell for the direct determination of oxygen in iron, iron alloys, steel, nickel, nickel alloys, copper, or copper alloys which is simple and economical to construct and is rugged and reliable in its operation.

An object of another aspect of this invention is to provide the apparatus with a heat-resistant, substantially electrically non-conductive tube which contains the electrolyte in which it is easy to develop an effective or adequate seal between the tube and the electrolyte.

An object of another aspect of this invention is to provide the apparatus with a heat-resistant, substantially electrically non-conductive tube which contains the electrolyte which has minimal residual stresses developed therein.

An object of another aspect of this invention is to provide the apparatus with a solid electrolyte in a form which is a considerable improvement over the discs sliced from rods of zirconia as proposed heretofore.

An object of still another aspect of this invention is to provide an apparatus with a reference electrode which is ambient, effectively well-buffered, and has an oxygen dissociation pressure relatively independent of temperature.

An object of yet another aspect of this invention is to provide an apparatus in which thermoelectric EMF's are minimal.

An object of still another aspect of this invention is to provide an apparatus for the determination of oxygen in molten steel in which the output is not substantially subject to fluctuations of the level of carbon contents.

An object of yet another aspect of this invention is to provide an apparatus in which the thermal response time is optimized.

An object of another aspect of this invention is to provide an oxygen-probe apparatus in which the thermal shock resistance is high.

An object of yet another aspect of this invention is to provide an oxygen-probe apparatus in which there is good resistance to metal penetration.

An object of still another aspect of this invention is to provide an apparatus in which the electrical lead is fastened intimately to the electrolyte.

General statement of the invention

By one broad aspect of this invention, a tip is provided for a probe for the direct determination of a dissolved gas in a molten metal, the probe tip comprising: (a) a heat-resistant, substantially electrically non-conductive tube; (b) a solid electrolyte which retains its ionic conduction properties and which does not exhibit substantial electronic conduction properties at the temperature of the molten metal, the electrolyte being a compact which has been individually formed from the solid electrolyte and a suitable fugitive binder, the compact being disposed and secured at one open end of the heat-resistant tube (a), the electrolyte compact being inset in the tube (a) by an amount of at least 1/16 inch, and protruding outwardly from the tube (a) by an amount of at least 1/16 inch; and (c) at least one electrically conductive metallic element in intimate electrical contact with the electrolyte.

In one variant of this aspect of this invention, the tip also includes (d) a plug, formed of heat-resistant, substantially electrically non-conductive material and provided with a longitudinally extending aperture therethrough, whereby the tube (a) is disposed within the aperture in plug (d).

By a second variant of this aspect of the invention, the plug (d) includes a first electrically conductive contact ring disposed within the aperture in plug (d), the ring being adapted to be in intimate electrical contact with the element (c) and a second electrically conductive contact ring disposed within the aperture in plug (d) and electrically insulated from the first contact ring and further including an electrically conductive metallic trigger element extending outwardly beyond the exposed end of the plug (d), the trigger element being adapted to be in intimate electrical contact with the second contact ring.

In a third variant of this aspect of this invention, the tip further includes (e) a tube formed of a structurally rigid, electrically conductive metal, having an outer surface for a major portion of its length, substantially non-disintegratable with respect to the molten metal being tested, the tube securing, at one open end thereof, the plug (d).

By a fourth variant of this aspect of the invention, the tip also includes (f) a protective cover over the exposed portion of the solid electrolyte compact (b), e.g. a fugitive cap or an extension of tube (e), the end of which has been closed over the solid electrolyte, preferably also including (g) an ablative covering over the protective cover to minimize deposition of slag therein.

By another aspect of this invention, a probe is provided for the direct determination of a dissolved gas in a molten metal, the probe comprising: (A) a tip including (a) a heat-resistant, substantially electrically non-conductive tube; (b) a solid electrolyte which retains its ionic conduction properties and which does not exhibit substantial electronic conduction properties at the temperature of the molten metal, the electrolyte being a compact which has been individually formed from the solid electrolyte and a suitable fugitive binder, the compact being disposed and secured at one open end of the heat-resistant tube (a), the electrolyte compact being inset in the tube (a) by an amount of at least 1/16 inch, and protruding outwardly from the tube (a) by an amount of at least 1/16 inch; (c) at least one electrically conductive metallic element in intimate electrical contact with the electrolyte; (d) a plug, formed of heat-resistant, substantially electrically non-conductive material and provided with a longitudinally extending aperture therethrough, whereby the tube (a) is disposed within the aperture in plug (d); and (e) a tube formed of a structurally rigid, electrically conductive metal, having an outer surface for a major portion of its length substantially non-disintegratable with respect to the molten metal being tested, the tube securing, at one open end thereof, the plug (d); (B) a structurally rigid, heat-resistant, electrically conductive lance; and (C) means associated with the probe tip (A) and the lance (B) for forming (i) a mechanical assembly of the probe tip (A) and the lance (B), (ii) a component of the lance (B) then also being in electrical contact with the electrically conductive metal element (A)(c), and (iii) providing connection to a gas supply to the lance (B) and probe tip (A).

In variants of this aspect of this invention, the probe tip may be any one of the variants as previously described hereinabove.

By still another aspect of this invention, a solid electrtrolyte compact is provided for use in a probe tip for the direct determination of a dissolved gas, e.g. oxygen in a molten metal, the electrolyte comprising an elongated compact which has been individually formed of solid oxide electrolyte which retains its ionic conduction properties and which does not exhibit substantial electronic conduction properties at the temperature of the molten metal, and a fugitive binder, the solid including a beaded wire-accepting depression axially therein.

General description of the invention

Thus, the inventive concept represented in one embodiment resides in the use of pressure compacting techniques wherein powdered solid electrolyte (e.g., lime-stabilized zirconia powder), is intimately mixed with a particular fugitive binder (e.g. biphenyl, or an aqueous polyvinyl alcohol solution), as well as a high temperature binder e.g. a small amount, say, of the order of about 4%, of $SiO_2$), is then formed into particularly-sized granules (e.g. by screening the mixture formed of the stabilized zirconia and the biphenyl binder, or by spray drying a slurry of the stabilized zirconia and the polyvinyl alcohol binder), is individually formed in a compression machine, e.g., an automatic pill-making machine, is baked and finally is sintered to a substantially gas impermeable individually formed compact of controlled density and structure. The use of such compacts of solid electrolyte thus fabricated directly to a prescribed shape by pressure compacting techniques is a considerable improvement over the use of discs sliced from rods of zirconia as previously suggested.

The electrolyte in compacted form proposed in accordance with all aspects of the invention possess several advantages, which are essential in the production of commercially practical oxygen probes. The specific advantages include:

(1) economy of material and fabrication;
(2) reliability because of complete freedom from centerline shrinkage porosity and internal longitudinal cracks prevalent in available zirconia rods;
(3) ease of fabrication to designed size and shape in high volume;
(4) controlled density for optimum thermal shock resistance consistent with maintenance of ability to be a practically complete ionic conductor of oxygen;
(5) facilitates making electrolyte-to-Vycor seals;
(6) facilitates the intimate attachment of either a single electrical lead or a pair of thermocouple wires by means of embedding a bead of such metal in the electrolyte; and
(7) facilitates the precise and reproducible placement and attachment of electrical leads and separate or combined electrical and thermocouple leads by pressing the beaded end of the wire or wires thus described into preformed depressions or valleys.

An improvement by a preferred aspect of this invention resides in the use of Vycor rather than quartz tubing. (Vycor is the trademark for a glass made by a process in which an article fabricated by conventional methods is chemically leached to remove substantially all of the ingredients except silica. When fired at high temperatures a transparent glass of high softening point and extremely low expansion coefficient is produced.) Vycor is only 96% silica and has a softening temperature of about 1530° C. which is almost 200° C. below that of quartz. It is easy to develop a good electrolyte-to-Vycor seal by heating a properly-sized Vycor tube in an oxygen-gas flame until the Vycor flows around the shaped compact of electrolyte to form an effective or adequate consistently good uniform circumferential seal. The sealing process may be automated for high production. Furthermore, the Vycor cools without substantial cracking and without substantial development of high residual stresses.

The combined use of Vycor and the pressure compacting techniques to make individually formed electrolyte compacts makes practical the use of gas reference electrodes in a commercial oxygen probe.

The choice of a gas for a reference electrode is important. Air has the advantage of being ambient and effectively well-buffered both chemically and thermally so that the delivery system does not have to be flushed before use, or be absolutely gas-tight. The electrolyte and the electrolyte-to-Vycor seal must, of course, be relatively impervious to molecular oxygen but need not be completely so because of the opposing ferro-static pressures, or the EMF of the cell will be lowered. These latter two factors are more important when the reference has a high oxygen potential than when the reference has an oxygen potential close to that of the unknown. Also, the partial pressure of air is almost independent of temperature. By contrast, $CO_2$ references are poorly buffered, difficult to handle, and have oxygen dissociation pressures quite dependent on temperature. The oxygen pressures in equilibrium with metal/metal oxides, are similarly temperature dependent.

While the oxygen content of air is stable over a wide range of temperature, it is recognized that the partial pressure of oxygen in air is dependent upon barometric pressure and the ambient oxygen varies with location. The dependence of the cell EMF on the reference electrode at selected oxygen contents of the liquid steel is a series of semi-logarithmic relationships which may be expressed as:

$$\Delta E = 93 \Delta \log P_{o_2} \quad (3)$$

where

E = change in cell voltage, mv.
$P_{o_2}$ = partial pressure of molecular oxygen, atmospheres The possible day-to-day variations of barometric pressure of close to ±one inch of mercury means that the $P_{o_2}$ in atmospheres may normally vary by about ±3 percent. This in turn causes a variation of about ±1½ percent in the determination of dissolved oxygen in steel because $$\Delta E = -186 \Delta \log [O] \quad (4)$$

where

E = change in cell voltage, mv.
[O] = soluble oxygen atoms, p.p.m.

The probe and lance should be constructed so that thermoelectric EMF's are minimal. It is convenient to use a Pt-13 Rh lead wire to the reference side of the solid electrolyte when the electrical lead to the liquid steel is steel. The thermoelectric effects are dependent on temperature. The Fe to Pt-13 Rh EMF at, e.g. 1600° C., is only about 2 mv., whereas the Fe to Pt EMF at, e.g., 1600° C., is about 20 mv. Also, the metals contacting one another in the oxygen sensor and the hot end of the lance must be chosen to have low thermoelectric Peltier effects which compensate one another. The net thermoelectric bias to the voltage of the present probe is about +one millivolt regardness of localized heating of the probe and lance during immersion in steel.

The shape of the electrolyte compact is important since it is necessary to optimize thermal shock resistance, thermal response, and "metal penetration." Long thin cylinder or long conical shapes are preferred because they have better thermal shock resistance and strength than a thin disc in the end of a Vycor tube. Also, the use of a long cylinder facilitates the proper location and effective sealing of the electrolyte into the Vycor. By controlling the depth of inset of the electrolyte compact into the Vycor tube, the resistance of the electrolyte to "metal penetration" by diffusion can be controlled. Metal penetration is an important consideration in use for steel, copper or nickel at high oxygen contents, e.g. 1100 p.p.m. in steel or 3000 p.p.m. in copper. It is also important to control the extent of protrusion of the electrolyte compact from the tip of the Vycor tube. The minimum depth of inset is about 1/16 inch, and the minimum extent of protrusion is about 1/16 inch. The protrusion would normally be about 1/8 to 1/4 inch, depending on the other geometry of the electrolyte compact. The above-discussed features are considered to be essential features of a practical commercial disposable oxygen probe.

The size of the electrolyte compact is a major controlling factor in the rate at which the cell reaches the temperature of the molten steel. The electrolyte compact usually has a length to diameter ratio ranging from 4 to 1. The other major factor is the diameter and thickness of the Vycor tube. In short, the thermal mass and geometry control the thermal response time of the cell.

The cell cannot generate the theoretical galvanic EMF until the reference side of the electrolyte compact has reached the temperature of the molten metal whose oxygen content is being determined. Therefore, the cell should be as small as practicable to achieve an optimal thermal response time.

Reproducibility of the cell voltage is only achievable by making the solid electrolyte compacts consistent with respect to required shape, size, location of electrical lead, void structures, density and composition.

The electrical lead or leads must be fastened intimately to the electrolyte compact. Achieving good electrical contact is one of the difficult problems in working with solid electrolytes. The solution provided by the present inventors is to mold a small diameter depression or valley in the electrolyte compact and to press fit the beaded end of the electrical head or leads into the depression or valley.

The void structure and density of the electrolyte compacts are related aspects depending on how the compacts are made. The compacts are preferably made from finely-divided lime-stabilized zirconia powder, a small amount of a finely-divided high temperature binder, e.g., $SiO_2$ in an amount of the order of 4% by weight, and a fugitive binder, e.g., biphenyl or an aqueous solution of polyvinyl alcohol. One sequence of manufacture is bonding with polyvinyl alcohol, molding and sintering. This produces compacts with many fine dispersed voids. Another sequence of manufacture is bonding with biphenyl using dry or moist heat, screening, molding under pressure, baking and sintering. A third and preferred sequence is by forming a slurry of the zirconia powder, the high temperature binder and the fugitive binder, spray drying, pressing, baking and sintering. This procedure tends to produce intergranular void structures and it is important that these be controlled so that the compacts are sufficiently impervious to transport of molecular oxygen. In all cases, the sintering parameters must be controlled to produce compacts having the required ionic conductivity and resistance to thermal shock, e.g. by a relative density of about 70%.

The probe includes a tube formed of a heat-resistant, non-metallic, substantially electrically non-conductive material. Examples of suitable such materials include quartz or Vycor, especially Vycor Code No. 7913.

The selection of an electrolyte is, of course, important. The solid electrolyte which can be used in the probe of an aspect of the present invention must retain ionic conduction properties and must not exhibit electronic conduction properties in the usual temperature ranges of the molten metal. These are generally oxides of metals having a valence of four and which have a high enough melting point. Zirconia is compatible with air as a reference electrode. Zirconia is also a good ionic conductor to below 10 p.p.m. oxygen in liquid steel. Some other oxides which may be used include: stabilized zirconia, pure thoria, pure hafnia, and thoria or hafnia having added thereto such metallic oxides as lanthia, yttria and scandia. A particularly suitable such zirconia is known by the trademark of TAM-R. It is preferred that the solid electrolyte which should be used in forming the electrolyte compacts usually have a particle size of plus 80 to minus 400 mesh Tyler.

The solid electrolyte powder is first mixed with a suitable fugitive binder and preferably also a suitable high temperature binder. Examples of suitable fugitive binders include biphenyl, and aqueous solutions of polyvinyl alcohol, polymethyl methacrylate, ethyl cellulose, zirconium nitrate in an alcoholic and/or aqueous dispersion, and zirconyl nitrate in an alcoholic and/or aqueous dispersion. A suitable high temperature binder is $SiO_2$.

A heat-protective sheath is provided to protect the electrical lead or leads and also to prevent undesired electrical contact between the electrical leads. Examples of suitable materials out of which to form such sheath include alumina, mullite, Alundum, quartz, and Vycor. (Alundum is the trademark for a line of fused-alumina refractory and abrasive products, having a fusion point 2000–2050° C.)

Suitable electrical lead wires include platinum, platinum/rhodium, tungsten, tungsten/rhenium, Chromel or Alumel. (Chromel is the trademark for an alloy of approximately 90% nickel and 10% chromium, with carefully controlled minor ingredients. Alumel is the trademark product for an alloy consisting of about 94% nickel, with small, carefully controlled amounts of silicon, aluminum and maganese). If a thermocouple pair of electrical wires is provided to measure the temperature of the electrolyte compact, it would be provided by two dissimilar metallic wires which are not subject to significant oxidation at the temperatures under which they are to be used. One suitable thermocouple to measure the temperature of the electrolyte compact is platinum-platinum/rhodium. Other thermocouples which may be used if the temperature conditions are low enough are tungsten-tungsten/rhenium and Chromel-Alumel.

The solid electrolyte must have on one face thereof a gas containing oxygen either in combined or uncombined form. Examples of suitable such gases include air, $CO/CO_2$, $CO_2/O_2$, $CO_2/N_2$, $N_2/O_2$, $O_2$, $H_2O/H_2$, $N_2O$, $NO$, $N_2O_5$ and $NO_3$.

It is preferred that the non-metallic, substantially electrically non-conductive tube be encased in a sheath. The sheath is formed of an electrically conductive metal which may be the same or similar to the molten metal whose oxygen content is to be determined. If the metals are substantially different, an EMF is produced by the thermocouple effect, and any readings must be corrected for such EMF. The sheath tube of the structurally rigid, electrically conductive metal is usually the same as the metal whose oxygen content is being determined. This may be iron, iron alloys, steel, nickel, nickel alloys, copper, or copper alloys.

The sheath tube has an exterior surface which is non-degradable by the molten metal whose dissolved oxygen content is being measured. This may be a steel tube, for use in molten copper, but, usually it would take the form of heat-stable or protective, electrically nonconductive material, e.g. a suitable synthetic plastics material or a refractory or ceramic material. Any such material which does not give off significant amounts of gases may be used. Examples include alumina, mullite, Alundum, cordierite, and asbestos fiber/cement composition, or a core sand. Such core sand may be provided by silica sand bonded by a two-stage binder which provides first a thermoplastic plastics material and then a thermoset plastics material. One example is the Novalak series of phenolic resins.

A protective cover, e.g., a fugitive protective cap or a crimped extension of the tube of electrically conductive metal, is provided over the exposed portion of the solid electrolyte. This is to protect the electrolyte only while the probe tip is passing through slag before it contacts the molten metal whose oxygen content is to be determined. The protective cover should be formed of material, e.g. which may be readily disintegrated or dissolved in the molten metal whose oxygen content is being determined, yet which is non-injurious to the metal whose oxygen content is being determined and does not appreciably disintegrate in the slag. Usually a cap formed of the same metal is used. Alternatively, any material which is disintegrated in the metal whose oxygen content is being determined but which does not give off substantial quantities of gas may be used.

Alternatively, the structurally rigid metallic tube may be extended over the probe tip, the overhang then being crimped to form the protective cover. The crimped, integral cover may also be provided with a vent hole. The protective cover may also preferably be provided with an ablative cover to minimize the slag from depositing directly on the protective cover which would thus delay the disintegration or dissolving of the protective cover in the molten metal, which, in turn, would delay the contact of the electrolyte with the molten metal. Such ablative cover may be masking tape or a cardboard tube.

The probe tip is preferably connected to the lance by an easily disconnectable mounting. Suitable such mountings include bayonnette-type, expansion-collet type, pressure, fit, push-on connection and spring pressure contact between concentric tubes. The connection also includes means to provide a substantially leak-free connection between the lance and a supply of the reference gas.

THE DRAWINGS

Brief description of the drawings

In the accompanying drawings.

Detailed description of the drawings

Figures 1, 2:
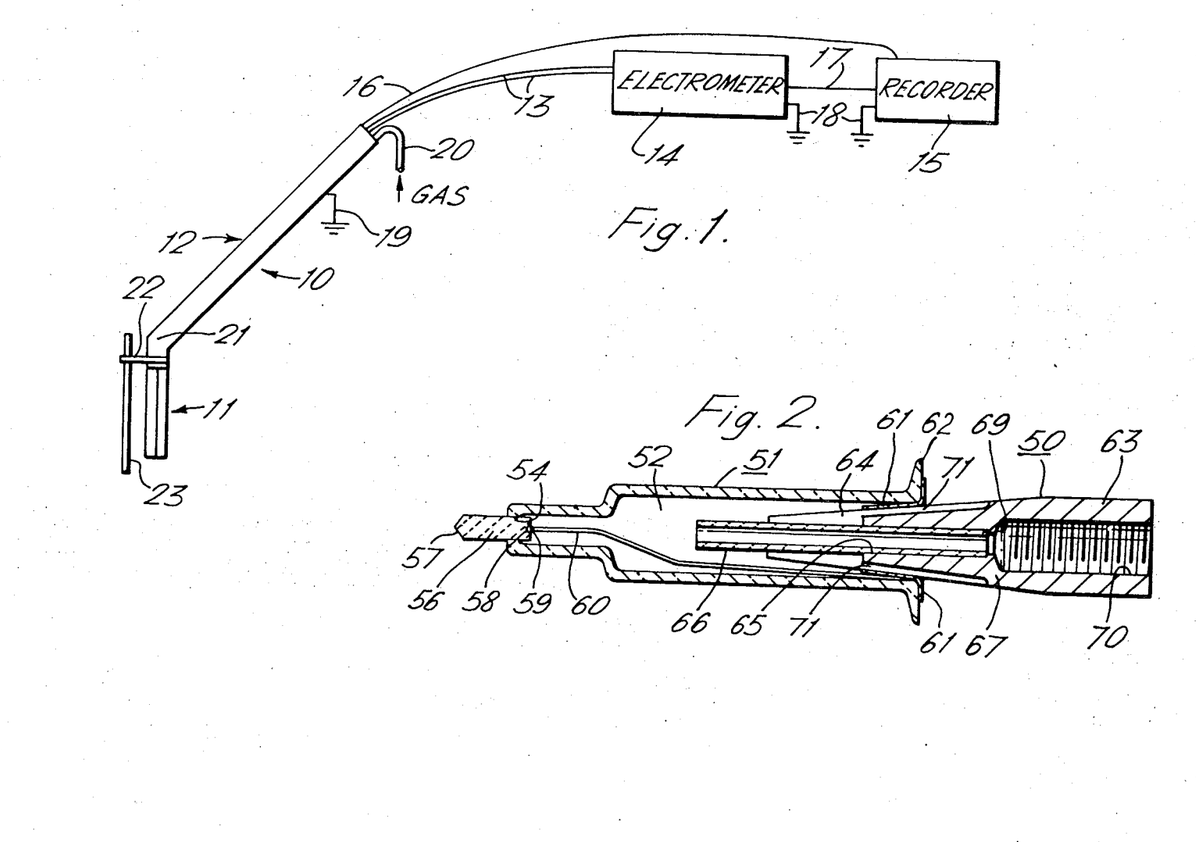
FIG. 1 is a schematic illustration of a direct oxygen probe system according to one aspect of this invention.
FIG. 2 is a central vertical sectional view of the probe tip and the probe-tip contacting portion of the probe lance of one aspect of this invention.

As shown in FIG. 1, the embodiment of the invention consists of a direct oxygen probe 10 comprising a probe tip 11 and a probe lance 12. Electrical wires 13 extend to an electrometer 14, and if, as shown, it is desired to have a record of the values of EMF, a recorder 15 may be electrically connected to the probe by wire 16 and to the electrometer 14 by wire 17. Each of the electrometer and the recorder are grounded, as at 18. The electrometer should have a higher impedance. Consequently, the electrometer may be placed by a high impedance amplifier.

The direct oxygen probe 10 thus includes a probe lance 12 which is formed of electrically conductive material e.g., steel grounded, as at 19. It is also provided with a tube 20 for the introduction of a reference gas, e.g. oxygen or air, to the probe tip 11. Secured to the distal end 21 of the probe lance 12 by means of an electrically conductive clamp 22 is a metal trigger rod 23. Also secured to the distal end 21 of the probe lance 12 is the probe tip 11.

One construction of the probe tip is shown in FIG. 2. The probe tip includes a tube 51 formed of a heat-resistant, substantially electrically non-conductive material, such as Vycor Code 7913. As also shown in FIG. 2, the probe-tip contacting portion of the probe lance is provided by a metal tip 50. Tube 51 includes a main portion 52, an auxiliary portion 53 of reduced diameter, and an apertured tip 54. Secured to the apertured tip 54 is the electrolyte compact 56. It is seen that the molded electrolyte compact 56 is in the form of an elongated cylinder coming to a point 57 and provided with a depression or valley 58 in its base. The solid electrolyte compact is, e.g. stabilized zirconia, the electrolyte being in the form of a compact of the solid oxide, e.g. the stabilized zirconia, and a fugitive binder, e.g. biphenyl and a small amount of a substantially non-fugitive binder, e.g. silica, individually formed by pressure-compacting techniques. Secured to the depression 58 by jamming is the bulbous end 59 of a platinum wire 60. Platinum wire 60 is secured to a stainless steel collar 61 at the flanged end 62 of the tube 51.

The metal tip 50 includes a substantially cylindrical base 63 terminating in a conical core 64 provided with a central bore 65 therein. A ceramic tube 66 is secured within the bore 65. The base 63 includes an internally threaded bore 70 which terminates in a shoulder 69. Slots 71 are provided to allow free return of air admitted to the interior of probe tip 51 from inlet tube 66 and back to the interior of the lance (not shown in FIG. 2 but shown in FIG. 3).

Figure 3:
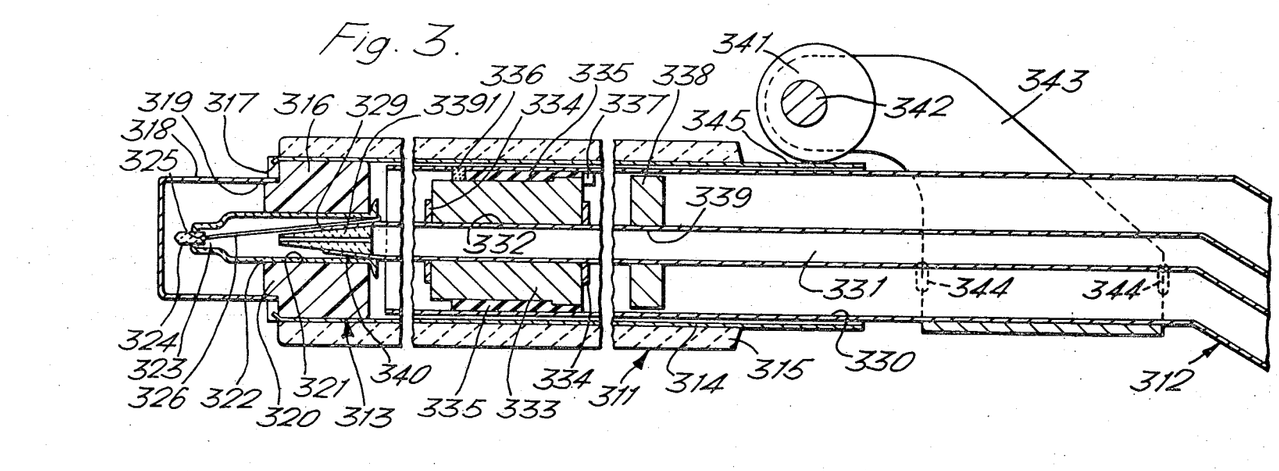
FIG. 3 is a central vertical sectional view showing the structure of the throw-away probe including a further aspect of the probe tip of the probe structure and the probe-tip contacting portion of the probe lance and also the disconnectable mounting between the probe and the lance of another aspect of this invention.

Turning now to FIG. 3, the direct oxygen probe 311 is seen to consist of a probe lance 312 and a probe tip 313. The probe tip 313 includes an outer, electrically conductive metal sheath 314, suitably formed of steel tubing, provided with a substantially cylindrical heat shield 315 thereon, suitably formed of a ceramic or refractory material as hereinbefore described. Secured to one open end of the probe tip 313 is a plug 316 (suitably formed of a ceramic or refractory material) by means of inwardly flared tips 317 on sheath 314. These tips 317 also provide electrical connection to ground the melt. A fugitive cap 318 suitably formed of copper or steel is disposed protectively around the end of the oxygen probe 311. It is secured thereon by engagement of its inner open faces 319 with the hexagonal (in cross-section) head 320 of plug 316.

Plug 316 is provided with a central bore 321 within which is secured a quartz tube 322 of the probe tip. The configuration and construction of quartz tube 322 is substantially the same as that of tube 51 previously described. The quartz tube 322 contains at its outer, partially open, constricted end 323 a premoulded mass of sintered solid electrolyte compact 324. Jammed into a depression 325 at the end of the solid electrolyte compact 324 is a platinum wire 326.

The lance 312 includes a structurally rigid, metallic, electrically conductive tube 330, suitably formed of steel. Disposed within, and in fixed longitudinal position within lance tube 330 is a metallic, electrically conductive inner tube 331, suitably formed of steel.

Inner tube 331 is provided with a flattened portion 332 and disposed about the flattened portion is a clamp 333 secured in position by ring-like end collars 334. The clamp 333 is adhesively secured to the inside of tube 330 by means of a suitable silicone rubber adhesive 335, e.g. 'Dow Corning 400,' introduced by means of adhesive introduction holes 336 in tube 330. The entire assembly is located in position adjacent a pin 337 depending downwardly from the interior of tube 330. The other end of tube 331 is spaced within tube 330 by means of collar 338 mounted on a second flattened portion 339 of tube 331 and fitting within tube 330.

Metal tube 331 is provided with a truncated conical end 340 adapted to be in electrical contact at 329 with probe tip wire 326. In addition, a ceramic gas-conducting tube 391 is secured to, and extends from, truncated conical end 340 of tube 331. The open end of quartz tube 321 is retained by frictional contact with end 340.

The lance 312 is provided with an easily disengageable connection with the probe tip 313. This consists of a knurled steel roller 341 eccentrically mounted on pin 342 between the brackets 343 welded, as at 344, to lance tube 330. Connection is provided by engagement of the knurled roller 341 with a knurled exposed circumferential face 345 of the probe tube 314.

Since sheath 314 is connected to grounded lance 312, and hence provides a grounded connection with the molten metal bath, the EMF generated is measured between the platinum wire 326 and the sheath 314, by means (not shown) connected to the lance. Since tube 331 is in electrical contact only with platinum wire 326 at point 329, no substantial EMF should be allowed to develop between wire 326 and tube 331. The EMF generated at point 329 is low, and tends to compensate the Pt-13 Rd to molten metal (e.g. iron or steel) EMF which is always generated if the wire 326 is Pt-13 Rh and the tube 331 is stainless steel.

In use, the probe tip 313 is secured to the lance 312 by engagement of the knurled roller 341 with the knurled circumferential face 345 of the sheath 314, and engagement of the outer rim of the truncated conical end 340 of tube 331 with the inner face of the quartz tube 320. A suitable gas (e.g. air) is circulated through tube 331. The lance 312 and tip 313 combination is immersed in the molten metal, the cap 318 melts away and the molten metal contacts solid electrolyte compact 324. Within a few seconds, a stable EMF reading is taken and the oxygen probe 311 is withdrawn. The probe tip 313 may be discarded, or it may be used one or two times more.

Figure 4:
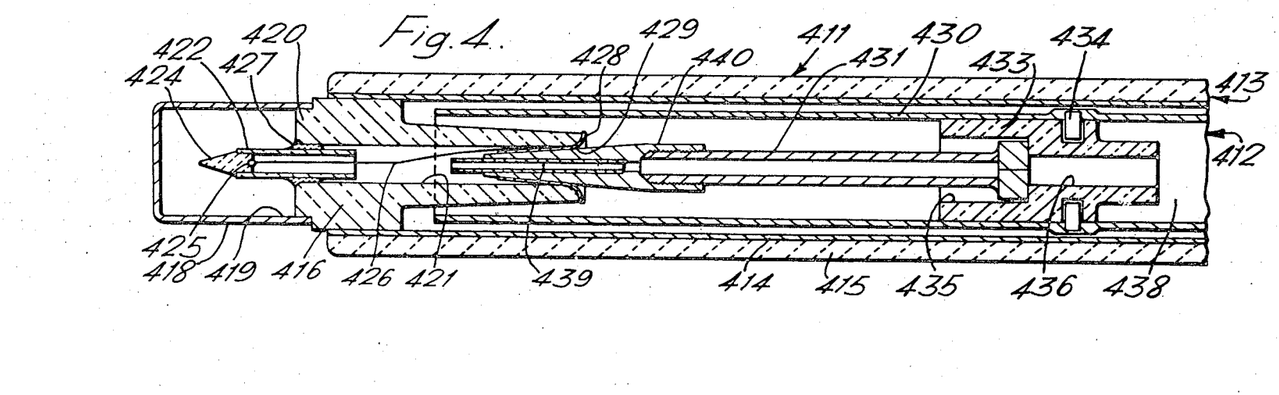
FIG. 4 is a central longitudinal section of a probe including a further aspect of the probe tip of the probe structure and the probe-tip contacting portion of the probe lance of another aspect of this invention.

Turning now to FIG. 4, the direct oxygen probe 411 is seen to consist of a probe lance 412 and a probe tip 413. The probe tip 413 includes an outer, electrically conductive metal sheath 414, suitably formed of steel tubing, provided with a substantially cylindrical heat shield 415 thereon, suitably formed of a ceramic or refractory material as hereinbefore described. Secured to one open end of the probe tip 413 is a plug 416 (suitably formed of a ceramic or refractory material) on sheath 414. A fugitive cap 418 suitably formed of copper or steel is disposed protectively around the end of the oxygen probe 411. It is secured thereon by engagement of its inner open faces 419 with the hexagonal (in cross-section) head 420 of plug 416.

Plug 416 is provided with a central bore 421 within which is secured a Vycor tube 422 of the probe tip by means of suitable adhesive 427. To Vycor tube 422 is fused the bullet-shaped electrolyte compact 424. An electrical lead wire 426 is jammed into a depression 425 in the center of the electrolyte compact 424. The electrical lead wire 426 is connected to a metal collar 428 at the open other end of 416.

The lance 412 includes an outer, electrically conductive metal lance tube 430 suitably formed of steel tubing. Disposed within lance tube 430 is a ceramic coupling 433, which is secured to the interior thereof by 434. Ceramic coupling 433 is provided with a central well 435 in which is secured concentric metal tube 431. Tube 431 extends and is threadedly secured to, a truncated conical metal tip 440, within which is secured ceramic gas-conducting tube 439. Ceramic coupling 433 is also provided with a central, gas-conducting bore, communicating with the interior bore 438 of lance tube 430.

Truncated conical tip 440 is adapted to be in electrical contact at 429 with probe tip wire 426 by means of collar 428. The open end of plug 416 is retained by frictional contact with tip 440.

Since sheath 414 is connected to grounded lance 412, and hence provides a grounded connection with the molten metal bath, the EMF generated is measured between the platinum wire 426 and the sheath 414, by means (not shown) connected to the lance. Since tube 431 is in electrical contact only with platinum wire 426 at point 429, no substantial EMF should be allowed to develop between wire 426 and tube 431. The EMF generated at point 429 is low, and tends to compensate the Pt-13 Rd to molten metal (e.g. iron or steel) EMF which is always generated if the wire 426 is Pt-13 Rd and the tube 431 is stainless steel.

In use, the probe tip 413 is secured to the lance 412 with engagement of the outer rim of the truncated conical tip 440 with the inner face of the plug 416. A suitable gas (e.g. air) is circulated through tube 431. The lance 412 and tip 413 combination is immersed in the molten metal, the cap 418 melts away and the molten metal contacts solid electrolyte compact 424. Within a few seconds, a stable EMF reading is taken and the oxygen probe 411 is withdrawn.

Figure 5:
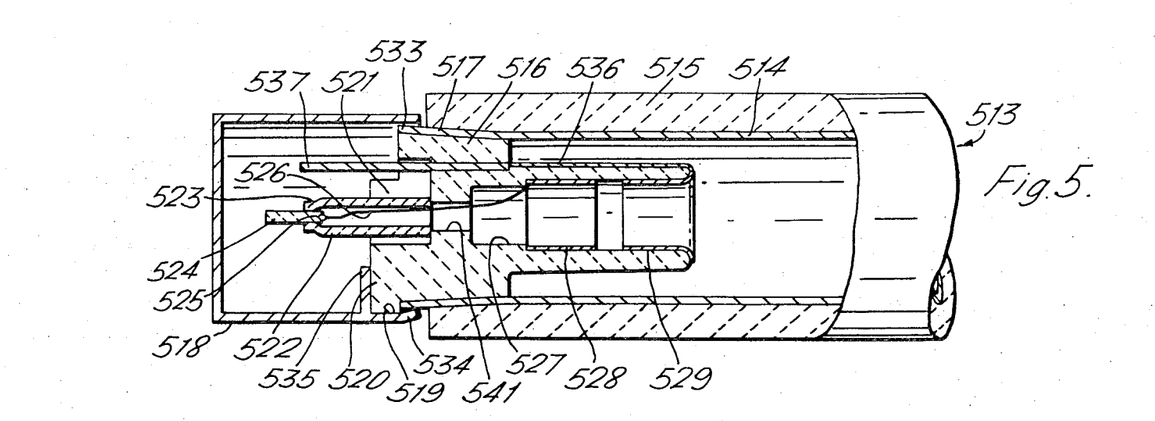
FIG. 5 is a central vertical sectional view of the probe tip of yet another aspect of the present invention.

Turning now to FIG. 5, there is shown a further embodiment of probe 513. The probe 513 includes an outer, electrically conductive metal sheath 514, suitably formed of steel tubing, provided with an outwardly flared tip 517 and further provided with a substantially cylindrical heat shield 515 thereon, suitably formed of a ceramic or refractory material as hereinbefore described. Secured to one terminal open end of the probe 513 is a plug 516 (suitably formed of a ceramic or refractory material) by means of frictional engagement with the outwardly flared tips 517 on sheath 514. A fugitive cap 518 suitably formed of copper or steel is disposed protectively around the end of the probe 513. It is secured thereon by engagement of its inner open faces 519 with the head 520 of plug 516, and with the exposed end 533 of tube 514 by means of inwardly turned-in portion 534. The limit of seating of cap 518 is provided by partial shoulder 535.

Plug 516 is provided with a first central well 521 within which is secured a Vycor tube 522 of the probe tip. The Vycor tube 522 contains, at its outer, partially open, constricted end 523 a pre-moulded mass of sintered solid electrolyte compact 524. Jammed into a depression 525 at the end of the solid electrolyte compact 524 is a platinum wire 526.

Plug 516 is also provided with a second central well 527, within which are secured, in axial spaced apart relationship to prevent electrical contact, an interior metal contact ring 528 and a terminal metal contact ring 529. Each of contact rings 528 and 529 is longitudinally split to provide a radially outward spring effect to retain the contact rings in the central well 527. Contact ring 528 is in electrical contact with wire 526, while contact ring 529 is in electrical contact, via lead 536 to trigger wire 537.

Plug 516 is also provided with a central bore 541 to place the interior of Vycor tube 522 which is in well 521 and well 527 in gas through-flow communication with the interior 542 of tube 514.

Figure 6:
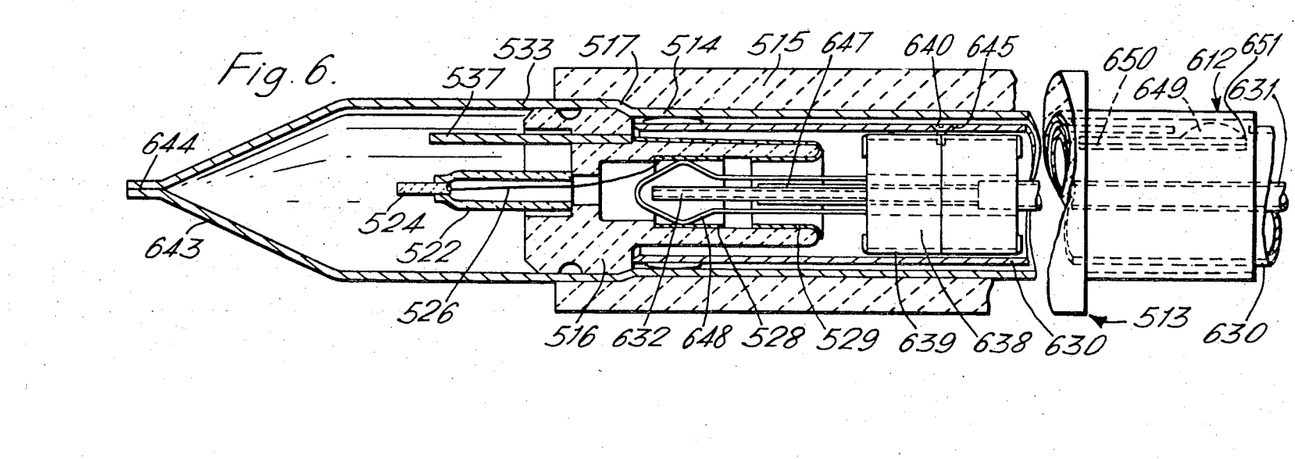
FIG. 6 is a central vertical sectional view of the probe tip of the embodiment of FIG. 5 and the lance connected thereto in the mechanical, electrical and reference gas senses.

FIG. 6 shows a variation of the embodiment of the probe of FIG. 5 in combination with a lance. To the extent that the same reference numerals are used in FIG. 6 as in FIG. 5, the parts are identical, and will not be further described. Instead, however, of the fugitive metal cap 518, the embodiment of FIG. 6 provides a substantial extension 533 of the tube 514, which extension is inwardly formed at 643 to be crimped at 644.

The lance 612 includes an outer, electrically conductive metal lance tube 630, suitably formed of steel tubing. Disposed within tube 630 is a contact holder 638, held together by two flat clamps 639, suitably formed of polytetrafluoroethylene or other heat stable electrically insulative material, by means of screw 640 through aperture 645 in tube 630. A central bore 646 is formed in contact holder 638 within which is secured first concentric inner metal tube 631 and second inner metal tube 632. An electrically conductive metal trigger contact 647 is disposed between tubes 631 and 632 within contact holder 638. Also extending through contact holder 638 is doubled-over wire loop contact 648. By means of the bores of tubes 631 and 632, gas may be conducted to the electrical lead wire 526-electrolyte compact 524 juncture. Electrical contact to the electrical lead wire 526 is provided by electrical contact between interior metal collar 528 and wire loop 648. Electrical contact between trigger contact tube 647 and terminal metal collar 529 is provided by spring steel strip carried from the contact holder 638 to the side (not shown) of the lance via a ceramic insulated steel wire (not shown). The trigger wire is at a selected D.C. voltage, e.g. 24 v. D.C. The bath and the molten metal therein is grounded. A complete circuit is provided by the probe tip and probe lance. As the cap melts, the trigger wire is shorted to ground which completes the electrical circuit. In essence, therefore, the trigger wire/molten metal together act as a "one-time" switch.

The lance 612 is provided with an easily disengageable connection with the probe 613. This consists of a steel circular segment contact 649 mounted on a flat spring steel plate 650 secured to the interior of tube 630 and projecting through slot 651 therein. Connection is provided by frictional engagement of the edge of contact 649 with the interior of tube 514. Contact 649 also provides electrical grounding between the probe and the lance.

Since sheath 514 is connected to grounded lance 612, and hence provides a grounded connection with the molten metal bath, the EMF generated is measured between platinum wire 526 and the sheath 514 by means (not shown) connected to the lance. Since tube 631 is in electrical contact only with platinum wire 526 at collar 528, no substantial EMF should be allowed to develop between wire 528 and tube 631. The EMF generated at collar 528 is low, and tends to compensate the Pt-13 Rd to molten metal (e.g. iron or steel) EMF which is always generated if the wire 526 is Pt-13 Rd and the tube 631 is stainless steel.

Figures 7, 8:
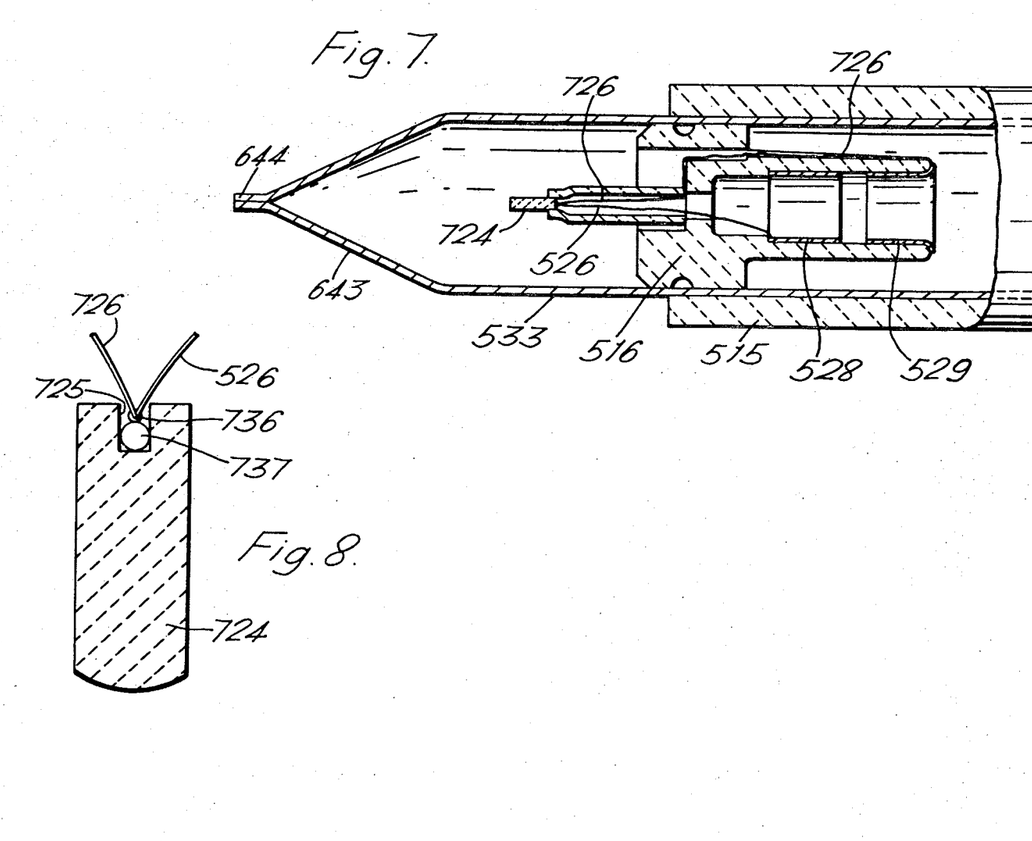
FIG. 7 is a central vertical sectional view of a combined oxygen probe tip and thermocouple of yet another aspect of this invention.
FIG. 8 is an enlarged cross-section of the electrolyte compact of the combined oxygen probe and thermocouple of FIG. 7.

Turning now to the variation shown in FIGS. 7 and 8, it is seen that the embodiments of FIGS. 5 and 6 have been modified to provide both an oxygen probe and a thermocouple. To the extent that the same reference numerals are used, the parts are identical.

It is necessary to ensure that it is the Pt-13 Rh lead, which is in contact with the zirconia. If the platinum is in contact with the zirconia when the oxygen EMF is measured between the Pt-13 Rh lead and the molten steel, it will be compensated by the Pt/Pt-13 Rh temperature EMF, which would then be in series with the oxygen cell. Thus, in the oxygen thermocouple probe assembly, the platinum/rhodium bead must be embedded in the zirconia. However, the platinum bead for a thermocouple does not have to be attached directly to the platinum/rhodium bead. The two beads could be separated by a short length of platinum/rhodium wire, as long as there is no significant temperature difference between the two beads.

One example of the bead structures is shown in FIG. 8.

It will be observed that the trigger wire 537 has been removed. The electrolyte compact 724 is provided with a depression 725 therein. The oxygen proble lead is provided by a platinum/platinum 13 rhodium wire 526. The thermocouple lead is provided by a platinum wire 726. The wires 526 and 726 are formed into a junction 736, and this junction is formed into a Pt-13 Rh ball 737, which is jammed into depression 725 in the compact 724. Wire 526 is in electrical contact with collar 528, while wire 726 extends around plug 516 to be in electrical contact with collar 529.

EXAMPLES

A series of tests have been carried out in a number of steel making furnaces, t.g. electric furnaces, basic oxygen vessels, open-hearths, ladles. The probes tested included those as shown in FIGS. 1–7. In essence, the heart of the probe is a small compact of stabilized zirconium oxide sealed into one end of a short Vycor tube. The solid electrolyte conducts oxygen ions under the driving force of a differential oxygen concentration. In operation, air is metered into the Vycor tube. This air is a thermally and chemically stable oxygen reference electrode. Liquid steel, containing oxygen, is the other electrode.

When the sensor is immersed in liquid steel, oxygen ions carry electrons from the reference side through the solid electrolyte to the steel side. The electrical circuit is completed through a recorder with relatively high impedance, which measures the voltage without polarizing the cell.

In one such system as tested, there is provided expendable probes, a tubular steel lance, a heavy-duty cable for air supply and electrical leads, plus control electronics and a chart recorder. The probes have a tubular steel body coated with refractory and are available in two and four-foot lengths. The probes slip onto the lance. Cardboard insulating tubes may also be slipped onto the lance for protection in open-hearth and basic oxygen vessels.

Figure 9:
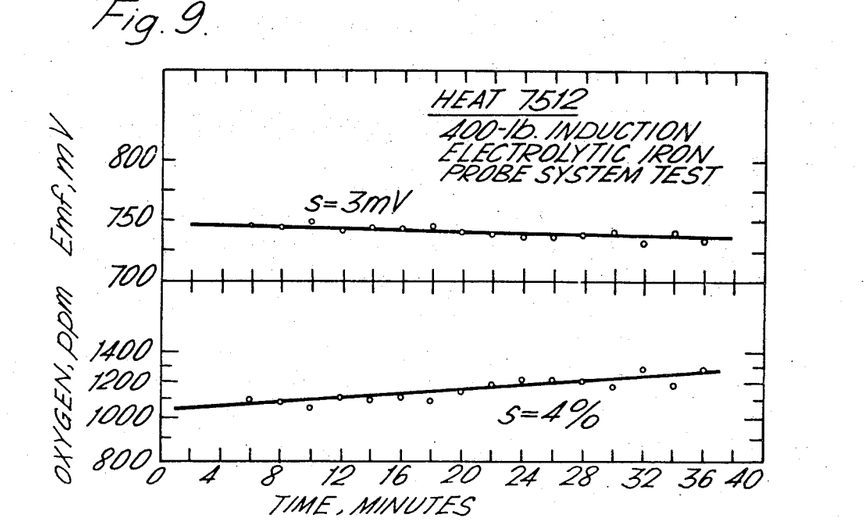
FIG. 9 is a graph of EMF, MV and oxygen, p.p.m. as ordinate versus time in minutes as abscissa to show the sequence of probe voltage and oxygen results plotted to illustrate probe-to-probe variability.
Figure 10:
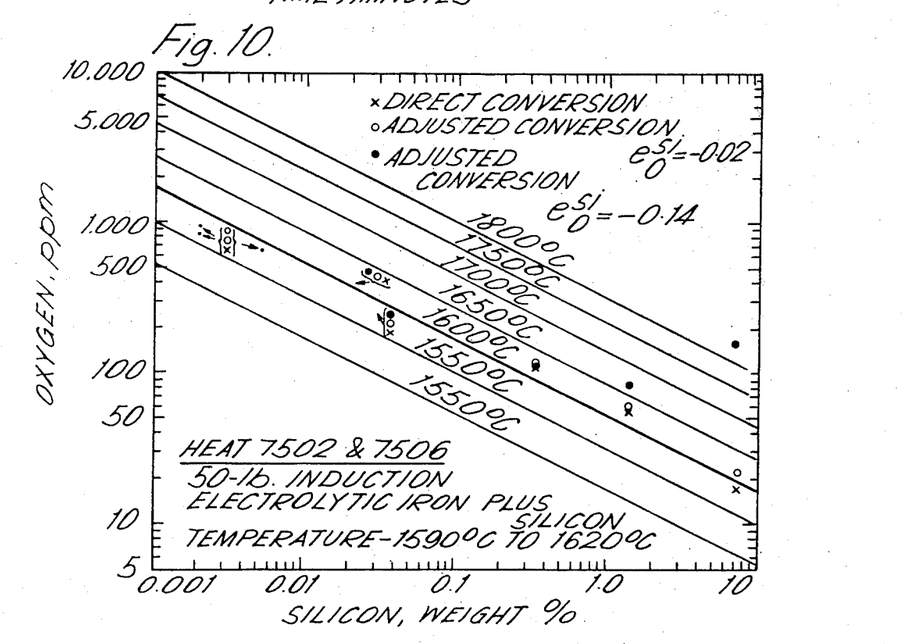
FIG. 10 is a log-log graph of oxygen, p.p.m. as ordinate versus silicon, weight percent as absciassa to show the probe results versus silicon in electrolytic iron, the reference isotherms being calculated.

Two examples of laboratory results are plotted in the graphs in FIGS. 9 and 10 respectively.

FIG. 9 graphically shows the variability of a sequence of OXP results in mv. and p.p.m. oxygen. FIG. 9 is of interest because it illustrates that iron is a very good solvent for oxygen. It is seen that oxygen was absorbed at a rate of about 6 p.p.m. per minute.

FIG. 10 shows how the probe can be used to investigate deoxidation phenomena in ordinary melts. Increments of ferrosilicon were added to two 50-lb. melts of electrolytic iron. Five minutes after each addition was made, and the melts were relatively uniform in oxygen, probe readings were taken. The EMF values were converted directly to theoretical oxygen values and plotted as crosses on a graph of log oxygen versus log silicon. These oxygen values were then corrected for the effect of silicon on the activity of the dissolved oxygen using the only interaction coefficients $e_O{}^{Si}$ reported in the literature. Using $e_O{}^{Si}=-0.2$ the adjusted oxygen values, plotted as open circles, come into rather close agreement with the theoretical curve for 1600° C. The agreement is particularly good when it is considered that the melt temperature varied between 1590 and 1620° C. over the hour required to complete the tests. Using $e_O{}^S=-0.14$ and plotting the results as filled circles, it is seen that the results are not in agreement with the previous conversions. FIG. 10 shows the oxygen-silicon equilibrium at 1500, 1600, 1700 and 1800° C. calculated using published data. The large influence of temperature on the solubility of oxygen is significant to steelmaking.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

We claim:

1. A solid electrolyte compact adapted for use in a probe tip for the direct determination of oxygen gas dissolved in a molten metal, said electrolyte compact having a uniformly fine intergranular void structure, a relative density of about 70% and being essentially impervious to transport of molecular oxygen, said solid electrolyte compact having been individually formed by a technique including:
   (i) providing a free flowing intimate mixture, in fine granular form, of
      (a) a solid electrolyte selected from the group consisting of lime-stabilized zirconia, yttria-stabilized thoria, magnesia-stabilized zirconia, thoria, hafnia, lanthia-stabilized thoria, scandia-stabilized thoria, lanthia-stabilized hafnia, yttria-stabilized hafnia, and scandia-stabilized hafnia, and
      (b) a fugitive binder selected from the group consisting of biphenyl, polyvinyl alcohol, an aqueous solution or dispersion of polymethyl methacrylate, an aqueous solution or dispersion of ethylcellulose, an aqueous solution or dispersion of zirconium nitrate, an aqueous solution or dispersion of zirconyl nitrate, an alcohol dispersion of zirconium nitrate and an alcohol dispersion of zirconyl nitrate,
   (ii) pressure compacting said intimate mixture, and
   (iii) sintering said pressure compacted intimate mixture, said compact including a depression axially therein for receiving a beaded wire,
thereby to provide a compact having high thermal shock resistance and ionic conductivity while being resistant to metal penetration.

2. The compact of claim 1 wherein said solid electrolyte is lime-stabilized zirconia.

3. The compact of claim 2 wherein said fugitive binder is polyvinyl alcohol.

4. The compact of claim 1 wherein said fugitive binder is polyvinyl alcohol.

References Cited

UNITED STATES PATENTS

| | | | |
|---|---|---|---|
| 3,616,407 | 10/1971 | Engell et al. | 204—195 S |
| 3,619,381 | 11/1971 | Fitterer | 204—1 T |
| 3,620,781 | 11/1971 | Garvie | 106—57 |
| 3,634,113 | 1/1972 | Fehrenbacher | 136—153 X |

FOREIGN PATENTS

| | | | |
|---|---|---|---|
| 1,191,222 | 5/1970 | Great Britain | 204—195 S |

OTHER REFERENCES

F. Singer et al., "Industrial Ceramics," pp. 1141, 1142, 1152 and 1153 (1963).

GERALD L. KAPLAN, Primary Examiner

U.S. Cl. X.R.

106—57